March 14, 1933. A. H. WARTH 1,900,963
BOTTLE CLOSURE
Filed March 27, 1930
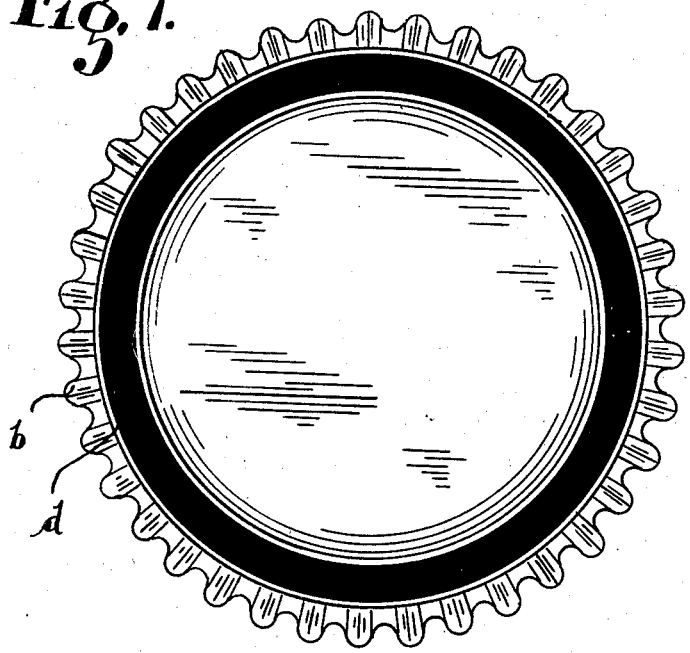
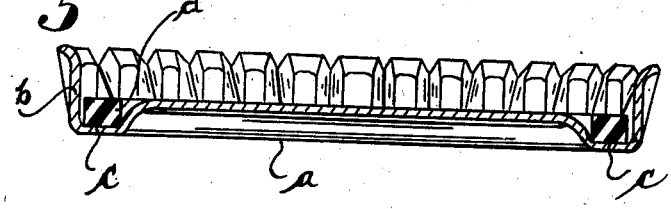
Albion H. Warth
INVENTOR
BY
ATTORNEY.

Patented Mar. 14, 1933

1,900,963

UNITED STATES PATENT OFFICE

ALBIN H. WARTH, OF BALTIMORE, MARYLAND, ASSIGNOR TO CROWN CORK & SEAL COMPANY, INC., OF NEW YORK, N. Y., A CORPORATION OF NEW YORK

BOTTLE CLOSURE

Application filed March 27, 1930. Serial No. 439,295.

My invention relates to bottle closures, and more particularly to bottle closures of the type in which an annular sealing gasket is formed in the metallic shell adjacent the skirt thereof.

Heretofore, I have devised a bottle closure of the type above referred to, in which the sealing gasket is composed of plastic material, including latex and a mineral filler, such as bentonite.

Caps embodying the above characteristic have been found suitable for use in the packaging of various foodstuffs and beverages, but have been found unsuited for use where fairly high pressures develop within a container, or where, after packaging and sealing, the container is subjected to high temperatures for the purposes of pasteurization, sterilization or further treatment of the contents of the container, such as the cooking of the contents thereof. This is due to the fact that while the plastic material of the gasket, when applied to a container by the ordinary capping machinery, will readily conform to the neck of the container so as to form a liquid and gas tight joint, this material, even after once setting within the cap, will soften when subjected to high temperatures and flow sufficiently to cause the loss of the liquid and gas tight seal, not only permitting the escape of the liquid or gaseous contents of the container, developing what is known as a leaker, but permitting air to subsequently enter the container and cause deterioration of the contents thereof.

With the above conditions in mind, I have produced a bottle closure of the general type above referred to, wherein the character of the packing gasket is such as to permit the production of the caps by the methods usually employed in the manufacture of caps of the general type to which the invention relates, and yet, when subjected to heat of an elevated temperature, will take a permanent set instead of softening and flowing in the manner above described.

Such a closure possesses all of the advantages of closures including packing gaskets formed of plastic composition consisting of latex and a mineral filler, so far as production of a cap and its application to a container is concerned, and will, in addition thereto, possess all of the desirable characteristics of a vulcanized rubber gasket-lined closure, and be without the undesirable characteristics of either.

In a closure embodying the invention, not only will the gasket take a permanent set when subjected to an elevated temperature, but in so doing will increase the effectiveness of its seal in preventing the escape of gases from the container. In actual practice, I have determined that while with the use of a plastic gasket, the maximum pressure which the closure will resist does not exceed 80 pounds, with the closure of my present invention, the gasket will withstand a pressure of 140 pounds, or more.

It is a recognized fact that soft vulcanized rubber possesses characteristics which, when brought in contact with various substances, will impart to such substances the characteristic taste of the rubber compound. Such rubber also contains ingredients which may be attacked by some of the constituents of various foodstuffs and beverages which will exaggerate this condition.

A bottle closure embodying the invention, in addition to its other characteristics, includes a gasket which, under no circumstances, will contaminate the contents of a container.

The invention consists primarily in a bottle cap embodying therein a metal shell and a skirt therefor, the top of said shell being provided with a channel adjacent said skirt, and a gasket within said channel, consisting of a rubber compound having a low content of a vulcanizing agent, whereby upon the subjection of a container, with a cap applied thereto, to heat, said gasket will be semi-vulcanized; and in such other novel characteristics as are hereinafter set forth and described, and more particularly pointed out in the claims hereto appended.

Referring to the drawing,

Fig. 1 is a bottom plan view of a bottle cap embodying the invention; and

Fig. 2 is a cross section thereof.

Like letters refer to like parts in both of said views.

In a bottle cap embodying my invention, I employ an ordinary metal shell with its skirt, by means of which it may be attached to the bottle. The top of the shell, adjacent said skirt, is provided with an annular channel.

In the drawing, the top of the shell is indicated at $a$, the skirt thereof at $b$ and the annular channel at $c$. In the type of cap illustrated, a fluted skirt, characteristic of what is known as "crown" caps, is disclosed and the scale of the drawing is much enlarged. Such caps are used with ordinary bottles and with various other types of containers, and the construction of the shell may be varied according to the type of container with which it is to be used.

Seated within the channel $c$ is a packing gasket $d$ consisting of a rubber compound, preferably formed of a water dispersed rubber, a mineral filler, a vulcanizing agent, a miscible accelerator belonging to a class of organic compounds known as piperidine compounds and a volatile alkali. The filler preferably used is bentonite.

The rubber constituent in the compound is approximately 25%; the bentonite, approximately 45%; the vulcanizing agent, sulfur, about .2 of 1%; zinc stearate, about .2 of 1% and free ammonia about .1 of 1%. The rubber constituent and the bentonite are at first thoroughly mixed. To this is added the sulfur, zinc stearate and free ammonia in suspension in water at a temperature of approximately 120° F. The accelerator is then added in solution form, the water of solution being at approximately 120° F.

It will be noted that the sulfur content is very low so that at the most, if subjected to heat at the proper vulcanizing temperature, there will only be a semi-vulcanization of the compound. This is highly desirable since the gasket, when the cap is in place on a container and is subjected to heat, will take a permanent set which will preclude its extrusion from between the metal shell and the neck of the container as a result of pressures developed within the container, but will develop none of those flavors characteristic of soft vulcanized rubber.

The gasket may be formed in the channel by an ordinary pouring operation, the channel being of sufficient depth to provide sufficient body or thickness to the gasket to permit the effective compaction thereof under the high pressures used in applying such caps to the containers.

The ammonia is used merely to facilitate the placing of the accelerator in solution and its incorporation in the plastic mass.

The compound is such that it cannot be produced by the ordinary rubber milling operations, and the accelerator used must be capable of going into solution.

In the completed cap there will undoubtedly be no trace of ammonia in the gasket, and the presence of the vulcanizing agent and the accelerator is indicated solely by the properties inherent to the gasket. Consequently, compounds other than that herein disclosed, may impart to the gasket the desired characteristics.

Since the gasket, after application to the channel of the shell, may be allowed to set under normal temperatures or under gentle heat, when the cap is applied to a container, the material of the gasket will be semi-plastic so as to readily conform to any irregularities in the neck of the container with which the gasket contacts. By locating the gasket in a channel it will not spread to any material extent when subjected to pressure, although it will readily be formed to the neck of the bottle by reason of its plasticity.

It is obvious that if the cap is used upon containers which are not, after the application of the cap, subjected to high temperatures, a seal will be obtained which is effective at the ordinary pressures present with carbonated beverages, which do not require sterilization, said pressures usually not exceeding 80 pounds per square inch. The seal will also be effective with containers filled with foodstuffs of various kinds which are not subjected to temperatures for cooking or sterilization following the application of the cap.

It has been found, however, that the seal ceases to be effective where the pressures developed exceed 80 pounds, or where the container, with the cap applied, is subjected to elevated temperatures, since the high pressures, alone or in the presence of high temperatures, will force the semi-plastic mass from between the channel and the neck of the container so as to break the seal, and the high temperatures will increase this tendency and also cause the plastic compound to flow within the contents of the container. I am referring to the conditions present when the compound contains no vulcanizing agent and no accelerator.

In the cap of the invention, however, the application of heat to the container, with the cap applied, will activate the vulcanizing medium used and thus, by reason of the contact of the compound with the metal shell, cause a rapid semi-vulcanization of the compound of which the gasket is formed before the pressures developed are sufficiently high to cause the extrusion of the compound in the manner above referred to. Furthermore, the application of heat at an elevated temperature, instead of softening the mass, will give it a permanent set. During the application of heat there will also be a tendency of the compound to expand and this will result in an increase in the effectiveness of the seal.

In the cap of the invention, therefore, the initial sealing operation of the container is the same irrespective of the conditions of use of the cap. If the container, after the application of the cap, is subjected to heat, the gasket in the cap undergoes changes which adapt the cap to this condition of use.

I have found, in actual practice, that water dispersed rubber gives more satisfactory results than latex. The latter, however, may be used with a sacrifice of some of the efficiency of the cap and yet be effective in preventing the formation of leakers as a result of the application of heat to the container with the cap applied.

It is essential that the content of the vulcanizing agent, sulfur, be very materially below the lowest content heretofore used in vulcanizing rubber. A higher content of vulcanizing medium will prevent the gasket having imparted thereto the desired degree of rigidity or permanency of set with the conditions of use present with such caps, and will impart thereto a distinct rubber flavor which will be imparted to the contents of the container.

It is not my intention to limit the invention to a gasket consisting of the precise proportions or ingredients herein specified, such being stated merely as disclosing the most effective compound of which I am aware. The low content of the vulcanizing medium, and the presence of an accelerator, however, are essentials in order to secure a cap having the desired characteristics.

Having described the invention, what I claim as new and desire to have protected by Letters Patent, is:—

1. A bottle cap embodying therein a metal shell and a skirt therefor, the top of said shell being provided with a channel adjacent said skirt, and a gasket within said channel, consisting of a rubber compound having a low content of a vulcanizing agent, whereby upon the subjection of a container, with a cap applied thereto, to heat, said gasket will be semi-vulcanized.

2. A bottle cap embodying therein a metal shell and a skirt therefor, the top of said shell being provided with a channel adjacent said skirt, and a gasket within said channel, consisting of a rubber compound embodying therein water dispersed rubber, a mineral filler, a low content of a vulcanizing agent, and an accelerator, whereby upon the subjection of a container, with a cap applied thereto, to heat, said gasket will be semi-vulcanized.

3. A bottle cap embodying therein a metal shell and a skirt therefor, the top of said shell being provided with a channel adjacent said skirt, and a gasket within said channel, consisting of a rubber compound embodying therein water dispersed rubber, a mineral filler, a low content of a vulcanizing agent, and a miscible accelerator, whereby upon the subjection of a container, with a cap applied thereto, to heat, said gasket will be semi-vulcanized.

4. A bottle cap embodying therein a metal shell and a skirt therefor, the top of said shell being provided with a channel adjacent said skirt, and a gasket within said channel, consisting of a rubber compound embodying therein water dispersed rubber, a mineral filler, a content of less than 1% of sulfur, and an accelerator, whereby upon the subjection of a container, with a cap applied thereto, to heat, said gasket will be semi-vulcanized.

5. A bottle cap embodying therein a metal shell and a fluted skirt therefor, the top of said shell being provided with a channel adjacent said skirt, and a gasket within said channel, consisting of a rubber compound embodying therein water dispersed rubber, a mineral filler, a low content of a vulcanizing agent, and an accelerator, whereby upon the subjection of a container, with a cap applied thereto, to heat, said gasket will be semi-vulcanized.

6. A bottle cap embodying therein a metal shell and a fluted skirt therefor, the top of said shell being provided with a channel adjacent said skirt, and a gasket within said channel, consisting of a rubber compound embodying therein water dispersed rubber, a mineral filler, a low content of a vulcanizing agent, and a miscible accelerator, whereby upon the subjection of a container, with a cap applied thereto, to heat, said gasket will be semi-vulcanized.

In witness whereof I have hereunto affixed my signature, this 8th day of March, 1930.

ALBIN H. WARTH.